(12) United States Patent
Klank et al.

(10) Patent No.: US 9,656,689 B2
(45) Date of Patent: *May 23, 2017

(54) SENSOR DEVICE AND METHOD FOR DETERMINING A STEERING ANGLE OF A VEHICLE AND DRIVER ASSISTANCE SYSTEM FOR A VEHICLE

(71) Applicant: ZF Friedrichshafen AG, Friedrichshafen (DE)

(72) Inventors: Michael Klank, Osnabrück (DE); Christoph Elbers, Stemwede (DE); Werner Kosak, Myakka City, FL (US)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/783,130

(22) PCT Filed: Mar. 11, 2014

(86) PCT No.: PCT/EP2014/054637
§ 371 (c)(1),
(2) Date: Oct. 8, 2015

(87) PCT Pub. No.: WO2014/166684
PCT Pub. Date: Oct. 16, 2014

(65) Prior Publication Data
US 2016/0046323 A1    Feb. 18, 2016

(30) Foreign Application Priority Data
Apr. 11, 2013    (DE) .................. 10 2013 206 346

(51) Int. Cl.
B62D 15/02    (2006.01)

(52) U.S. Cl.
CPC ......... B62D 15/025 (2013.01); B62D 15/021 (2013.01); B62D 15/027 (2013.01)

(58) Field of Classification Search
USPC .......... 345/173; 463/36, 37; 340/431, 691.6; 701/36, 41
See application file for complete search history.

(56) References Cited

U.S. PATENT DOCUMENTS

| 5,821,935 A | * | 10/1998 | Hartman | ................ B60K 37/06 307/10.1 |
| 2002/0135163 A1 | * | 9/2002 | Derrick | ................ B60Q 1/1484 280/731 |

(Continued)

FOREIGN PATENT DOCUMENTS

| CN | 201 498 098 U | 6/2010 |
| DE | 199 14 397 A1 | 10/2000 |
| KR | 2012 0078359 A | 7/2012 |

OTHER PUBLICATIONS

International Search Report Corresponding to PCT/EP2014/054637 mailed Jun. 25, 2014.

(Continued)

*Primary Examiner* — Thomas Tarcza
*Assistant Examiner* — Richard Goldman
(74) *Attorney, Agent, or Firm* — Davis & Bujold, P.L.L.C.; Michael J. Bujold

(57) ABSTRACT

A sensor device (120) for determining a steering angle (δ) of a vehicle. The sensor device (120) is, or can be, fitted separately and/or retrofitted on a steering wheel (102) of the vehicle. The sensor device (120) comprises an accelerometer for the detection of an acceleration relative to at least two axes (gx, gy). The accelerometer is designed to emit a sensor signal that represents the detected acceleration in order to determine the steering angle (δ).

15 Claims, 2 Drawing Sheets

(56) References Cited

U.S. PATENT DOCUMENTS

| | | | |
|---|---|---|---|
| 2003/0067148 A1* | 4/2003 | Keutz | B60R 11/04 |
| | | | 280/731 |
| 2008/0061954 A1* | 3/2008 | Kulas | B60K 35/00 |
| | | | 340/438 |
| 2008/0287189 A1* | 11/2008 | Rabin | A63F 13/06 |
| | | | 463/36 |
| 2009/0043488 A1* | 2/2009 | Nakayama | G01C 21/3484 |
| | | | 701/532 |
| 2010/0292903 A1 | 11/2010 | Stoehr et al. | |
| 2012/0142417 A1* | 6/2012 | Haswell | A63F 13/803 |
| | | | 463/37 |
| 2012/0322558 A1* | 12/2012 | Tiley | A63F 13/02 |
| | | | 463/37 |
| 2014/0062891 A1* | 3/2014 | Powell | B62D 1/046 |
| | | | 345/173 |
| 2015/0002285 A1* | 1/2015 | Hatakeyama | B60K 35/00 |
| | | | 340/435 |
| 2015/0042478 A1* | 2/2015 | Kuo | G08B 21/02 |
| | | | 340/576 |
| 2015/0286385 A1* | 10/2015 | Kim | B62D 1/046 |
| | | | 340/461 |
| 2016/0039457 A1* | 2/2016 | Klank | B62D 1/046 |
| | | | 701/41 |

OTHER PUBLICATIONS

Written Opinion Corresponding to PCT/EP2014/054637 mailed Jun. 25, 2014.
CN Office Action corresponding to CN Application No. 201480020613.X dated Aug. 29, 2016.

* cited by examiner

SENSOR DEVICE AND METHOD FOR DETERMINING A STEERING ANGLE OF A VEHICLE AND DRIVER ASSISTANCE SYSTEM FOR A VEHICLE This application is a National Stage completion of PCT/EP2014/054637 filed Mar. 11, 2014, which claims priority from German patent application serial no. 10 2013 206 346.6 filed Apr. 11, 2013.

FIELD OF THE INVENTION

The present invention relates to a sensor device for determining a steering angle of a vehicle, a driver assistance system for a vehicle, a method for determining a steering angle of a vehicle, and the use of an accelerometer for determining a steering angle of a vehicle and for providing at least one driver assistance function using the steering angle.

BACKGROUND OF THE INVENTION

Steering angles of vehicles are usually determined by means of a factory-fitted steering angle sensor on a steering column. Sensor signals are usually passed on via a cable to a control unit, often for functions such as ABS or ESP, and are processed in the control unit. The control unit then transmits the steering angle information for example to a CAN bus of the vehicle and thereby brings other control devices into play. For this, an assistance system such as a parking and maneuvering aid receives the steering angle from the CAN bus. Steering angle information on the CAN bus is not normally standardized and can differ depending on the vehicle model and year, the vehicle manufacturer and the type of vehicle.

SUMMARY OF THE INVENTION

Against this background the present invention provides an improved sensor device for determining a steering angle of a vehicle, an improved driver assistance system for a vehicle, an improved method for determining a steering angle of a vehicle and an improved application of an accelerometer, in accordance with the advantageous design features that emerge from the description given below.

According to embodiments of the present invention, a steering angle sensor can be provided as a retrofit solution for implementing for example parking and/or maneuvering aid functions. For that purpose an accelerometer or a device containing one can be retrofitted to a steering wheel in order to enable the steering angle to be determined. The steering angle so determined can be used for at least one driver assistance function.

Advantageously, such a steering angle sensor can be used in particular in any road vehicle steered by means of a steering wheel. Thus a solution suitable for retrofitting can be provided for driver assistance functions such as a parking and maneuvering aid, so that there is no need to provide vehicle-specific software for evaluating the steering angle information or sensor signals for each type of vehicle. Accordingly, such a function can be retrofitted even to vehicles without a CAN bus and even without a factory-installed steering angle sensor. In other words the invention provides a universal steering angle sensor that can be retrofitted.

The present invention provides a sensor device for determining a steering angle of a vehicle, wherein the sensor device is and/or can be installed or retrofitted separately on a steering wheel of the vehicle, such that the sensor device comprises an accelerometer for determining acceleration relative to at least two axes, and wherein the accelerometer is designed to emit a sensor signal that represents the acceleration detected for the determination of the steering angle.

In this context a vehicle can be understood to mean a road vehicle, a motor vehicle for transporting people and/or goods such as a passenger car, a truck or some other utility vehicle. The vehicle can be one that is steered by means of a steering wheel. Separate or able to be retrofitted is understood in the sense that the sensor device is not integrated in the steering wheel or part of the steering wheel. The sensor device for retrofitting can be arranged on any part of the steering wheel that does not interfere with the operation of the vehicle. The sensor device can be supplied with energy, for example from a battery. Apart from that, the sensor device can be powered by wireless means, by induction. The accelerometer can be an inertial sensor or the like. Inertial sensors serve for the measurement of accelerations and turning rates as well as inclinations in space. The accelerometer can be designed to detect acceleration relative to two or more axes produced by rotational movement of the steering wheel by a driver of the vehicle. In particular, in this case, relative to two axes of the accelerometer, the gravitational acceleration or acceleration related to the gravitational acceleration can be determined. In order to determine the steering angle, the accelerometer can be designed to enable the determination of a steering wheel rotational angle using the sensor signal or the acceleration determined. A steering wheel rotational direction can also be determined. From the acceleration or steering wheel rotation angle detected, the steering angle of the vehicle can be determined.

In an embodiment of the invention a communication device can be provided for the wireless emission of the sensor signal obtained. The communication device can be designed to send and if necessary to receive signals. In particular, in this case the sensor signal can be transmitted by radio. Such an embodiment has the advantage that a driver of the vehicle is not troubled, for example, by a cable running from the sensor device to a control unit or the like. Wireless signal transmission enables the sensor device to be retrofitted in a safe and convenient manner.

In particular the sensor device can be designed to be installed separately and/or retrofitted onto the steering wheel of the vehicle without using tools. The sensor device can be designed to be installed separately and/or retrofitted onto the steering wheel by means of a bonded or adhesive joint, a locking clamp or the like. In that case the sensor device can be installed onto the steering wheel by means of a connecting element so that the sensor device can be removed from the steering wheel for maintenance purposes. Such an embodiment has the advantage that the sensor device can be installed particularly simply and inexpensively. In particular, the sensor device can be in the form of an individual unit or, however, a mobile communication device, preferably a Smartphone or a mobile minicomputer.

The present invention also provides a driver assistance system for a vehicle, wherein the driver assistance system is designed to provide at least one driver assistance function related to a steering angle of the vehicle. The driver assistance system has the following features:

an embodiment of the sensor device mentioned above for determining a steering angle of the vehicle, which device is or can be installed and/or retrofitted separately on the steering wheel of the vehicle; and a control unit for evaluating the sensor signal from the sensor device, the control unit being designed such that, using the sensor signal, it determines the steering angle of the vehicle and using the steering angle, it provides at least one driver assistance function.

A sensor device as mentioned above can advantageously be included or used in connection with the driver assistance system. In particular, the driver assistance system can be designed as a parking and/or maneuvering aid. The sensor device and the control unit can be provided separately from one another, the sensor device being arranged on the steering wheel and the control unit separate from the steering wheel. Alternatively the sensor device and the control unit can be provided in the form of a conjoint assembly. Indeed, the sensor device can comprise the control unit.

According to an embodiment, a transmitter-receiver device can be provided for the wireless reception of the sensor signal from the sensor device and for the transmission of the signal to the control unit. In particular, in this case the sensor signal can be received by radio or by infra-red means. For example, the sensor signal can be emitted to the control unit by wire circuitry. Such an embodiment has the advantage that a driver of the vehicle is not interfered with, for example, by a cable running from the sensor device to the control unit. Wireless signal transmission enables the sensor device to be retrofitted in a secure and convenient manner.

The control unit can also be designed to evaluate a variation of the sensor signal in order to determine a number of steering wheel rotations for the determination of the steering angle. Thus, the control unit can be designed to record a history or variation of the sensor signal or of the acceleration detected. Consequently, starting from a standard steering wheel position that corresponds to driving the vehicle straight ahead, it is even possible to determine a steering angle produced by more than one complete revolution of the steering wheel. Such an embodiment has the advantage that an actual steering angle of the vehicle can be determined more correctly and accurately if, on the basis of the variation of the acceleration produced by a steering wheel rotational movement, the number of steering wheel revolutions is taken into account.

In a preferred embodiment the signal receiver can also consist of a Smartphone or a mobile minicomputer. Applications run on the aforesaid devices can then take over the evaluation and display functions as well.

Furthermore a low-pass filter can be provided for filtering out or suppressing high-frequency signal fractions (in particular ones caused by vibrations) from the sensor signal, and for letting through low-frequency signal fractions (in particular those relating to steering movements). The low-pass filter can be in the form of a stand-alone device, or part of the control unit, and/or as a software function. For example, on an uneven road accelerations due to bumps or vibrations in the vertical direction of the vehicle are superimposed on the gravitational acceleration. Since a movement of the steering wheel occurs more slowly than such bumps or vibrations, low-pass filtering can filter out such perturbations. This enables precise measurement of the acceleration and hence of the steering angle.

In addition a further sensor device, which can be or is installed and/or retrofitted separately from the steering wheel in the vehicle, can be provided in order to detect a further acceleration relative to at least two axes and to generate a further sensor signal that represents the further acceleration. In this case, the control device can be designed to determine the steering angle using both the sensor signal and the further sensor signal. The further sensor device can correspond to the sensor device that is or can be installed on the steering wheel. When the further acceleration, or a tilting of the vehicle relative to the gravitational acceleration vector, is detected by the further sensor device installed in the vehicle, an adjusted steering angle can be calculated by subtracting the tilt from the steering angle measured or detected. For example, if the vehicle drives from a horizontal road onto a road inclined to the left or right, then the further sensor device can prevent the sensor device from wrongly interpreting this as a rotation of the steering wheel for no other reason than that the gravitational acceleration vector is no longer directed perpendicularly to the road. Thus, the actual steering angle of the vehicle can be determined more accurately since, using the further acceleration detected by the further sensor device, the acceleration determined by the sensor device is adjusted or corrected by means of the further acceleration detected by the further sensor device.

The present invention also provides a method for determining a steering angle of a vehicle, the method having the following steps:

determination of acceleration relative to at least two axes by means of an accelerometer of a sensor device that is or can be installed separately or retrofitted on a steering wheel of the vehicle, in particular a mobile minicomputer; and evaluation of the acceleration determined, in order to determine the steering angle of the vehicle.

The method can be implemented advantageously using a driver assistance system as described above or a sensor device as described above, or in combination with a driver assistance system as described above or a sensor device as described above.

It is also advantageous to use an accelerometer designed to detect acceleration relative to at least two axes, to determine a steering angle of a vehicle and to provide at least one driver assistance function using the steering angle, such that the accelerometer is part of a sensor device which is or can be retrofitted to a steering wheel of the vehicle.

The accelerometer is preferably designed with a low-pass filter for the suppression of high-frequency signal fractions in the sensor signal and for letting through low-frequency signal fractions caused by steering movements.

The accelerometer and/or the sensor device for the detection, evaluation and processing of signals and for passing them on is, in particular, in the form of a mobile minicomputer (processor) in which a computer program suitable for signal processing is stored.

BRIEF DESCRIPTION OF THE DRAWINGS

An example of the invention is explained in greater detail with reference to the attached drawings, which show.

DETAILED DESCRIPTION OF THE PREFERRED EMBODIMENTS

In the following description of preferred example embodiments of the present invention, the same or similar indexes are used for elements shown in the various figures that have similar functions, so that there is no need for repeated descriptions of those elements.

Figure 1:
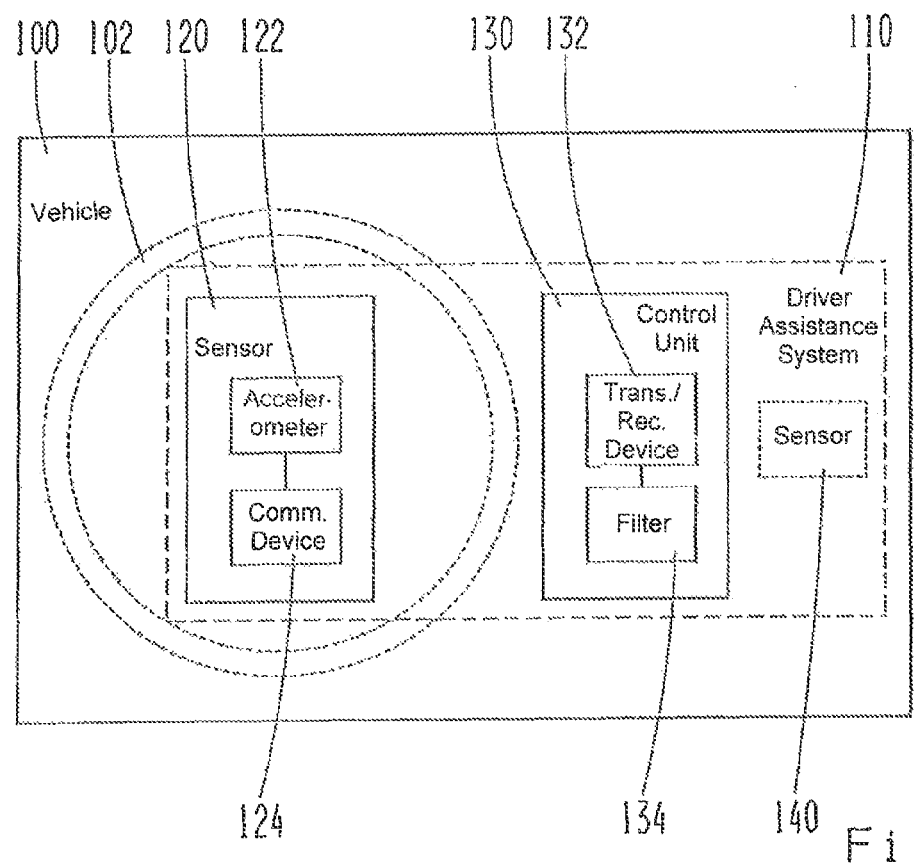
FIG. 1: A schematic representation of a driver assistance system according to an example embodiment of the present invention, and of a steering wheel of a vehicle.

FIG. 1 shows a schematic representation of a driver assistance system according to an example embodiment of the present invention, and of a steering wheel of a vehicle. The figure shows a vehicle 100, a steering wheel 102, a driver assistance system 110, a sensor device 120, an accelerometer 122, communication device 124, a control unit 130, a transmitter-receiver device 132, a low-pass filter 134 and an optional further sensor device 140. The driver assistance system 110 comprises the sensor device 120, the control unit 130 and, optionally, the further sensor device 140. The driver assistance system 110 is designed to provide at least one driver assistance function related to a steering angle of the vehicle 100. A parking aid and/or a maneuvering aid are examples of such driver assistance functions.

The sensor device 120 is arranged on the steering wheel 102 of the vehicle 100. In particular, the sensor device 120 is installed on the steering wheel 102 in such manner that no tools need be used to fit it, even though this is not explicitly evident from FIG. 1. In this case the sensor device 120 is also designed to be retrofitted onto the steering wheel 102 of the vehicle. For example, the sensor device 120 is bonded to the steering wheel 102 or clamped onto it. The sensor device 120 can be supplied with energy for example from a battery, or inductively. The sensor device 120 includes the accelerometer 122 and the communication device 124.

The accelerometer 122 of the sensor device 120 is designed to detect acceleration relative to at least two axes, produced during movement of the steering wheel 102. In particular, the accelerometer 122 is an inertial sensor. The accelerometer is also designed to emit a sensor signal that represents the acceleration detected. The communication device 124 of the sensor device 120 is designed to emit the sensor signal produced, by wireless means.

According to the example embodiment of the present invention described and shown in FIG. 1, the control unit 130 is arranged separately from the steering wheel 102. In a different example embodiment of the present invention the control unit 130 is arranged on the steering wheel 102 together with the sensor device 120, in the form of a conjoint assembly. The control unit 130 comprises the transmitter-receiver device 132 and the low-pass filter 134. The transmitter-receiver device 132 is designed to receive the sensor signal produced and emitted by the sensor device 120 by wireless means, and to pass it on to the control device 130.

The low-pass filter 134 is designed to filter out from the sensor signal received, any high-frequency signal fractions produced due to vibrations of the vehicle 100 and thus also the steering wheel 102. Such high-frequency signal fractions could otherwise falsify the acceleration determined. Thus, the low-pass filter is designed to let through low-frequency signal fractions of the sensor signal received, which are attributable to actual steering movements of the steering wheel 102. In this context the low-pass filter can have a variable filtering function with an adjustable threshold.

The control unit 130 is designed to evaluate the sensor signal in order, using the acceleration represented by the sensor signal, to determine the steering angle of the vehicle 100. In addition the control unit 130 is designed to provide, using the steering angle, the at least one driver assistance function for the driver assistance system 110. Alternatively, the control unit 130 is designed to use the steering angle for the emission of a steering angle signal to a driver assistance function control unit (not shown in FIG. 1) of the driver assistance system 110, in order to provide the at least one driver assistance function.

The optionally provided further sensor device 140 is arranged in the vehicle 100 separately from the steering wheel 102. The further sensor device 140 is designed to detect further acceleration relative to at least two axes. For example, the further sensor device 140 corresponds to the sensor device 120 and for example comprises a further accelerometer and a further communication device. In this case the further acceleration represents forces that act upon the vehicle 100 other than actuation forces produced by direct action upon the steering wheel 102. Furthermore, the further sensor device 140 is designed to generate a further sensor signal that represents the further acceleration. The control device 130 is designed to determine the steering angle of the vehicle 100 using both the sensor signal and the further sensor signal. Thus, when the steering angle has been determined, a position of the vehicle 100 in the Earth's gravitational field can be taken into account or disregarded.

Figure 2:
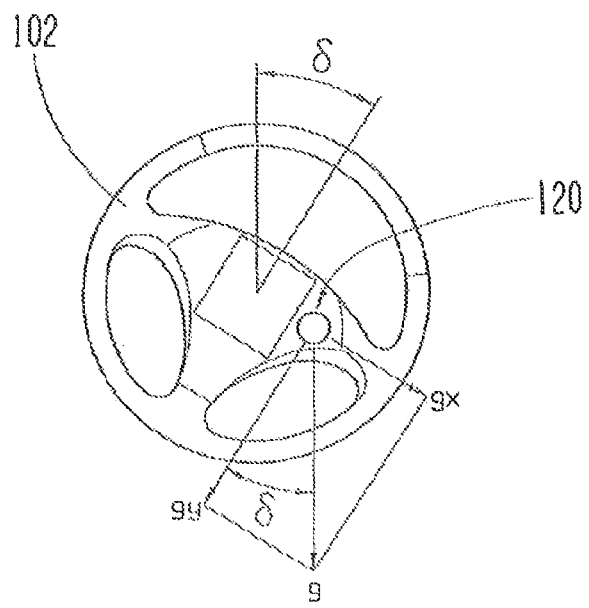
FIG. 2: A schematic representation of a sensor device according to an example embodiment of the present invention, installed on a steering wheel of a vehicle.

FIG. 2 shows a schematic representation of a sensor device according to an example embodiment of the present invention, on a steering wheel of a vehicle. The figure shows a steering wheel 102, which can for example be the steering wheel in FIG. 1, a sensor device 120, again for example that shown in FIG. 1, a steering angle $\delta$, the gravitational acceleration vector g, and a first detection axis gx and a second detection axis gy of the sensor device 120. The sensor device 120 is fixed on the steering wheel 102, for example at a distance away from a rotational axis of the steering wheel 102.

Thus, on the steering wheel 102 there is mounted the sensor device 120 or an acceleration sensor which is designed to determine acceleration acting on the steering wheel 102 relative to at least two axes gx and gy or in at least two directions. So long as the vehicle 100 is for example moving slowly, it is mainly the gravitational acceleration that acts on the device 120. From the measured gravitational accelerations (or gravitational acceleration components) in the x- and y-directions of the sensor device 120, or relative to the two detection axes gx and gy of the sensor device 120, the steering angle $\delta$ is then calculated or determined. In particular, that is done in accordance with the following equation:

$$\delta = a\,\tan(gx/gy)$$

This gives the steering angle $\delta$ as the arc-tangent of the quotient of the acceleration fractions along the first detection axis gx and along the second detection axis gy.

According to a further example embodiment of the present invention, for example the control unit of FIG. 1 is arranged together with the sensor device 120 on the steering wheel 102, even though that is not explicitly shown in FIG. 2.

Figure 3:
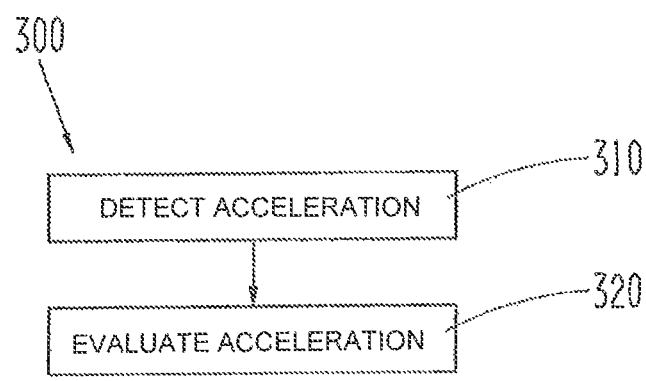
FIG. 3: A sequence diagram of a method according to an example embodiment of the present invention.

FIG. 3 shows a sequence diagram of a method 300 for determining a steering angle of a vehicle, in accordance with an example embodiment of the present invention. The method 300 has a step 310 in which acceleration relative to at least two axes is detected by means of an accelerometer of a sensor device retrofitted on a steering wheel of the vehicle. The method 300 also has a step 320 in which the detected acceleration is evaluated in order to determine the steering angle of the vehicle.

By carrying out the method 300, a steering angle of a vehicle can be determined advantageously by means of a sensor device and by means of a control unit, as shown and described in FIGS. 1 and 2, and if needs be by means of a driver assistance system such as the driver assistance system shown and described in FIG. 1. The steps of the method 300 can be carried out by, or using, suitable devices of the sensor device or driver assistance system shown in FIGS. 1 and 2. For this, the detection step 310 can be carried out by means of the accelerometer of the sensor device in FIG. 1. In addition the evaluation step 320 can be carried out by means of the control unit in FIG. 1.

The example embodiments described and shown in the figures have only been chosen as examples. Different example embodiments can be combined with one another completely or in relation to individual features. Furthermore, one example embodiment can be supplemented by features of another example embodiment.

INDEXES

100 Vehicle
102 Steering wheel
110 Driver assistance system
120 Sensor device
122 Accelerometer
124 Communication device
130 Control unit
132 Transmitter-receiver device
134 Low-pass filter
140 Further sensor device
δ Steering angle
g Gravitational acceleration
gx First detection axis, acceleration component
gy Second detection axis, acceleration component
300 Determination method
310 Detection step
320 Evaluation step

The invention claimed is:

1. A sensor device (120) for determining a steering angle (δ) of a steering wheel,
wherein the sensor device (120) is securable on the steering wheel (102) of the vehicle (100),
the sensor device (120) comprises an accelerometer (122) that detects acceleration relative to at least two axes (gx, gy), and
the accelerometer (122) emits a sensor signal to a processor, the sensor signal represents the detected acceleration and is evaluated by the processor to determine the steering angle (δ) of the steering wheel.

2. The sensor device (120) according to claim 1, wherein the sensor device (120) includes a communication device (124) that wirelessly emits the produced sensor signal.

3. The sensor device (120) according to claim 1, wherein the sensor device (120) is designed so as to be securable to a preexisting steering wheel (102) of the vehicle (100) without use of hand tools.

4. The sensor device (120) according to claim 1, wherein the sensor device (120) includes a low-pass filter (134) that blocks high-frequency acceleration changes from the sensor signal and permits passage of low-frequency acceleration changes produced by steering wheel movements.

5. The sensor device (120) according to claim 1, wherein the processor determines a steering angle of the vehicle from the determined steering angle of the steering wheel.

6. A driver assistance system (110) for a vehicle (100), the driver assistance system (110) produces at least one driver assistance function related to a steering angle (δ) of a steering wheel, the driver assistance system (110) comprising:
a sensor device (120) that determines the steering angle (δ) of the steering wheel, the sensor device (120) is securable on the steering wheel (102) of the vehicle (100), the sensor device (120) comprises an accelerometer (122) that detects acceleration relative to at least two axes (gx, gy), and the accelerometer (122) emits a sensor signal that represents the detected acceleration in order to determine the steering angle (δ) of the steering wheel;
a control unit (130), having a processor, receives the sensor signal from the sensor device (120) and evaluates the sensor signal to determine the steering angle (δ) of the steering wheel, and, from the determined steering angle (δ) of the steering wheel, the control unit provides the at least one driver assistance function; and
the driver assistance system (110) includes a transmitter-receiver device (132) that wirelessly receives the sensor signal from the sensor device (120) and transmits the sensor signal to the control unit (130).

7. The driver assistance system (110) according to claim 6, wherein the control unit determines a steering angle of the vehicle from the determined steering angle of the steering wheel.

8. The driver assistance system (110) according to claim 6, wherein the control unit (130) evaluates variations of the sensor signal in order to determine a number of revolutions of the steering wheel (102) and the steering angle (δ) of the steering wheel.

9. The driver assistance system (110) according to claim 6, wherein the driver assistance system (110) includes a low-pass filter (134) that blocks high-frequency acceleration changes in the sensor signal and permits passage of low-frequency acceleration changes produced by steering wheel movements.

10. The driver assistance system (110) according to claim 6, wherein the driver assistance system (110) includes a further sensor device (140) that is fitted remotely, from the steering wheel (102) in the vehicle (100), the further sensor device detects further acceleration relative to the at least two axes and generates a further sensor signal that represents the further acceleration detected, and the control unit (130) evaluates the sensor signal and the further sensor signal to determine the steering angle (δ) of the steering wheel.

11. A method (300) for determining a steering angle (δ) of a steering wheel, the method (300) comprising:
detecting (310) acceleration relative to at least two axes (gx, gy) with an accelerometer (122) of a sensor device (120) that is secured on the steering wheel (102) of a vehicle (100); and
evaluating (320) the detected acceleration with a processor to determine the steering angle (δ) of the steering wheel.

12. The method according to claim 11, further comprising determining, with the processor, a steering angle of the vehicle from the steering angle of the steering wheel.

13. An accelerometer (122) to detect acceleration relative to at least two axes (gx, gy), the accelerometer having a processor that evaluates the detected acceleration and determines a steering angle (δ) of a steering wheel and provides at least one driver assistance function using the steering angle (δ), and the accelerometer (122) is part of a sensor device (120) which is secured onto the steering wheel (102) of a vehicle (100).

14. The accelerometer (122) according to claim 13, further comprising a low-pass filter that suppresses high-frequency acceleration changes from the sensor signal and permits passage of low-frequency acceleration changes produced by steering wheel movements.

15. The accelerometer according to claim 13, wherein signal detection, signal evaluation and signal processing and relaying thereof are carried out by a mobile minicomputer which has a computer program stored therein that processes the signals.

\* \* \* \* \*